June 19, 1934.  I. POMIERANIEC  1,963,591
PLANTING MACHINE
Filed Nov. 25, 1930  3 Sheets-Sheet 1
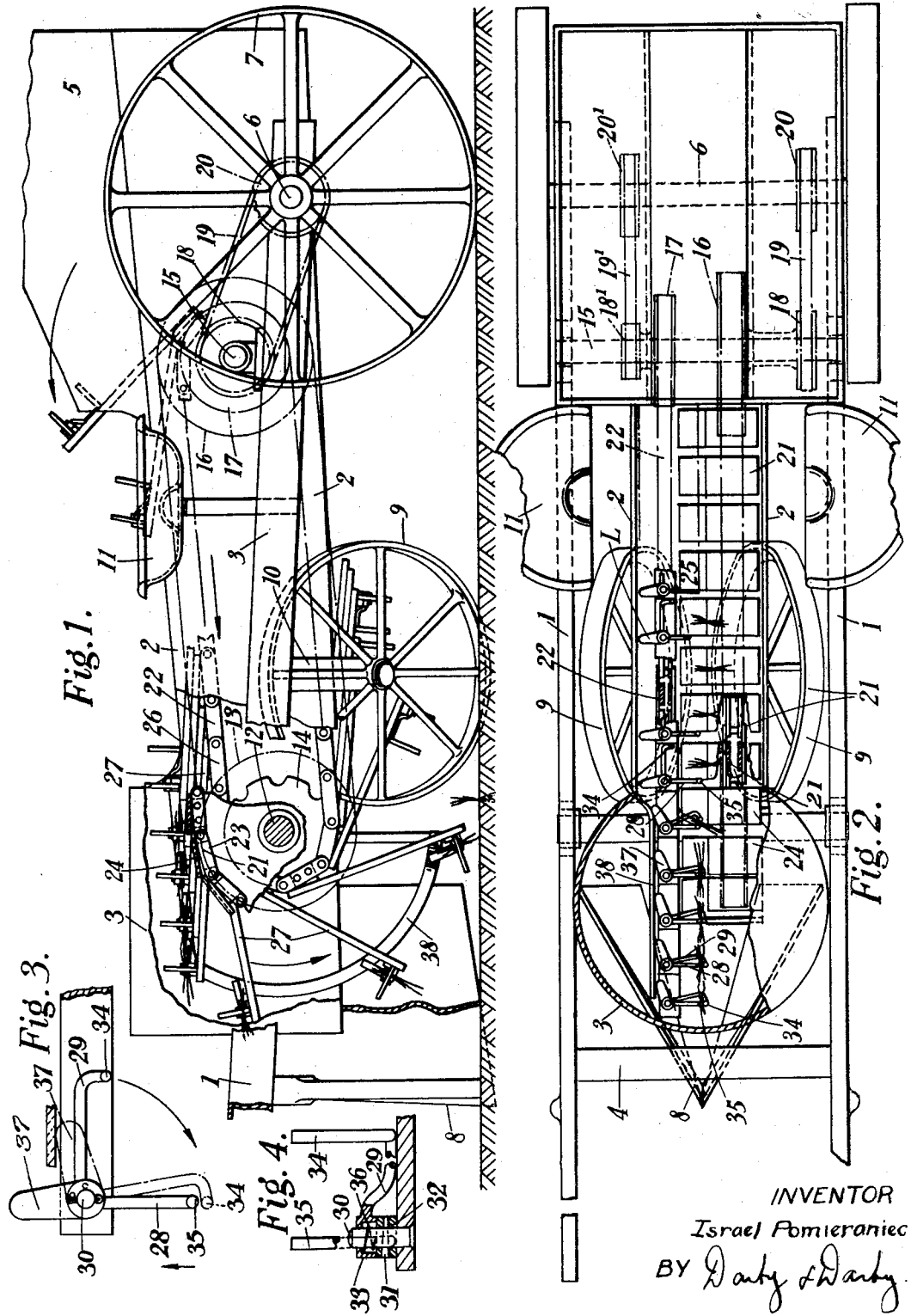
INVENTOR
Israel Pomieraniec
BY
ATTORNEYS.

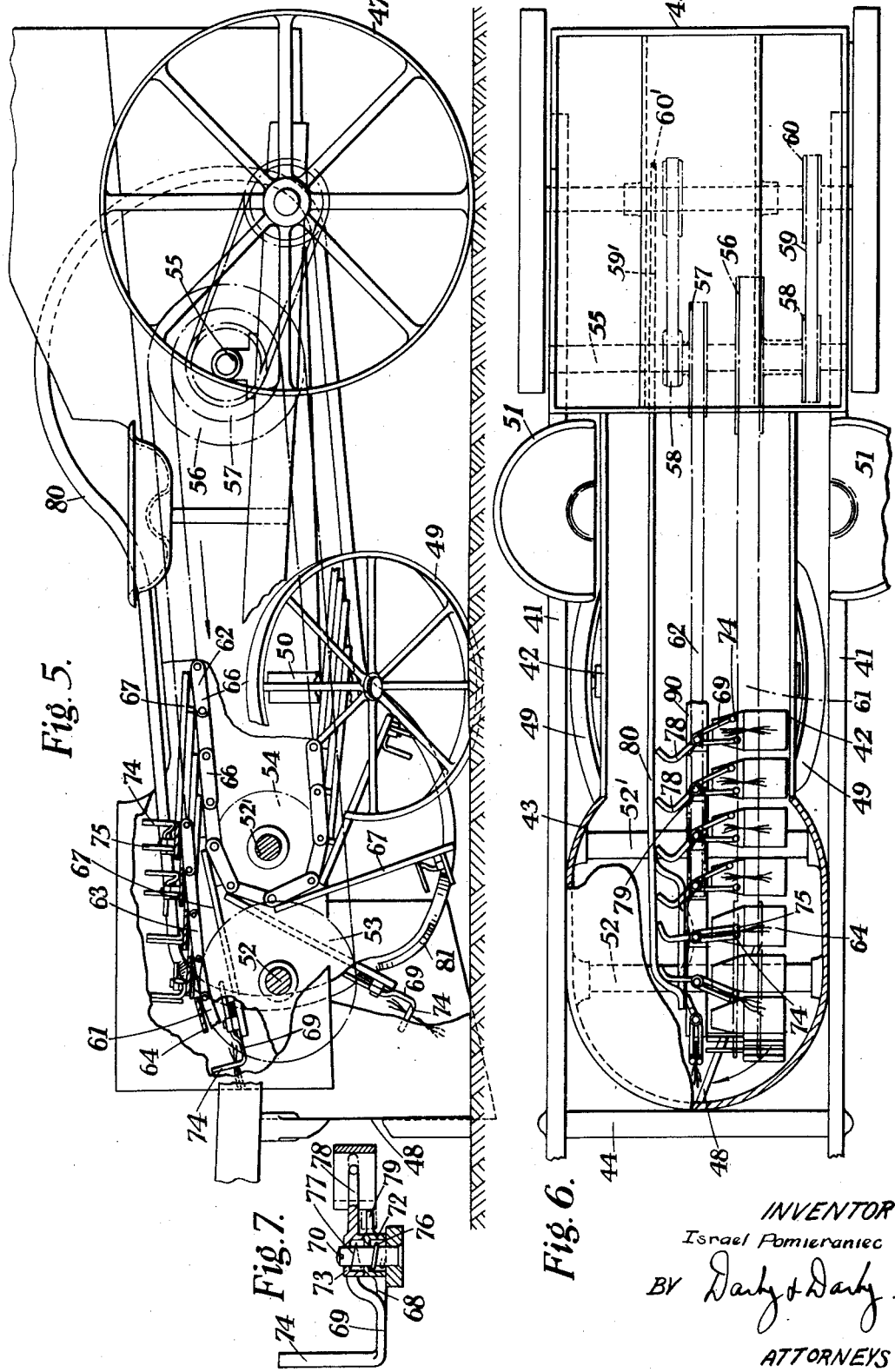

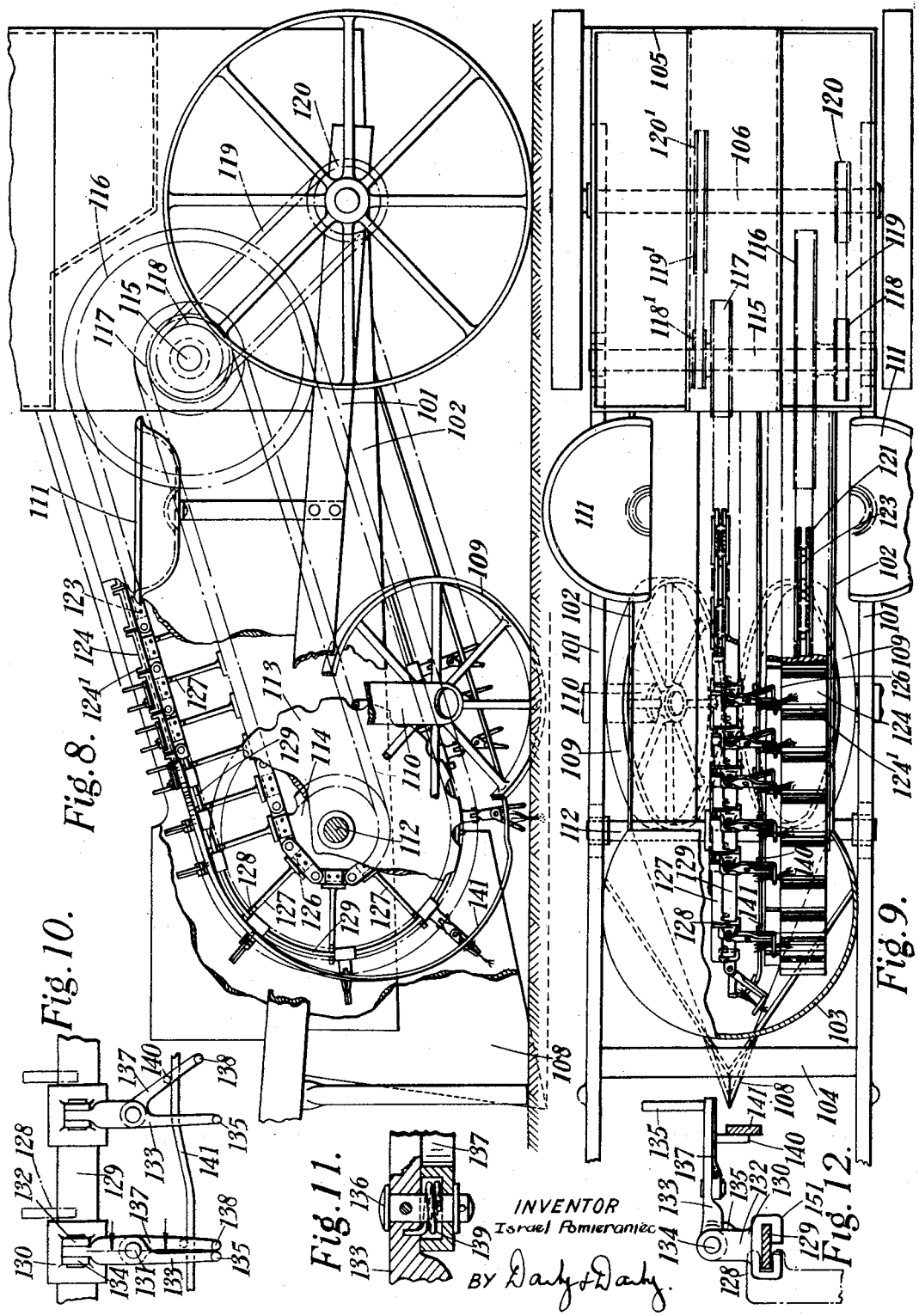

Patented June 19, 1934

1,963,591

UNITED STATES PATENT OFFICE 1,963,591

PLANTING MACHINE

Israel Pomieraniec, London, England

Application November 25, 1930, Serial No. 498,021
In Great Britain November 26, 1929

19 Claims. (Cl. 111—3)

The present invention relates to improvements in or relating to planting machines.

The machine is particularly adapted for use in planting any farm or garden plants, such as rape, corn, tobacco and in general any young plants, or even trees or growing bulbs.

It is one of the objects of the invention to provide a planting machine which, whilst permitting the plants to be fed to it in relatively closely spaced relation, enables them to be planted at the required distances apart, and ensures that the plants and actual planting members are spaced apart and do not interfere with one another at the instant when the plants are planted. This is important since when the plants are held out to be planted they are liable to become entangled one with another if they are held too close together.

It is a further object of the invention to provide improved means for carrying the plants to planting position.

Other objects and advantages will be evident from the following description.

According to the present invention I provide a plant setting machine having a conveyor on to which the plants are fed and a series of devices for carrying the plants from the conveyor to the soil, the said devices at the instant of transfer of the plants thereto from the conveyor travelling at substantially the same speed and in substantially the same direction as the conveyor or the portion thereof carrying the plant to be transferred.

By causing the means or devices for carrying the plants to the soil, hereinafter referred to as the planting means to conform substantially in speed and direction to the conveyor or conveyors, the transfer of the plants from the one to the other is greatly facilitated. In a preferred form of the invention the speed of the conveyor is constant and that of the planting means variable, but such that the planting means is moving in the same direction and at the same speed as the conveyor at the instant when a plant is transferred from the conveyor to the planting means.

The planting means preferably include means for gripping the plants and for causing them to assume a correct position root downwards in a furrow which may be thrown up by a suitable share mounted on the machine, or in a hole formed in any suitable way such as by a projection mounted on the gripping device itself.

The conveyors of which there may be one or more preferably each comprise an endless conveyor band composed of articulated elements or links each consisting of a platform preferably provided with a wall portion. The plants are fed on to the conveyor by being placed across the separate links of the conveyor band. It will be understood that other forms of conveyors may be used. The plant gripping means are preferably carried by another endless band and are preferably carried at a distance from their point of support by the band such as at the extremities of arms carried by the band. The conveyors and the gripping means are so arranged that when a plant is to be gripped and removed from the conveyor its leaf portion comes to lie between the jaws of the gripping device which is at that instant travelling with substantially the same speed and in substantially the same direction as the conveyor. Means are preferably provided for turning the plants through about 90° so that they project towards the soil instead of lying across the conveyor.

In order that the invention may be well understood preferred embodiments thereof will be described by way of example only with reference to the accompanying drawings in which:

Figure 1 is a side elevation partly broken away of a preferred form of planting machine;

Fig. 2 is a plan thereof, partly broken away;

Fig. 3 is a fragmentary plan view of one of the gripping devices;

Fig. 4 is a fragmentary side elevation partly in section of one of the gripping devices, looking in the direction of the arrow in Fig. 3;

Fig. 5 is a side elevation partly broken away of a modified form of machine;

Fig. 6 is a plan thereof, partly broken away;

Fig. 7 is an end view partly in section of one of the gripping devices in closed position, as seen looking from right to left in Figs. 5 or 6;

Fig. 8 is a side elevation partly broken away of a further modified form of machine;

Fig. 9 is a plan thereof partly broken away;

Fig. 10 is a fragmentary plan view of two of the gripping devices of the machines of Figs. 8, 9;

Fig. 11 is a fragmentary sectional view of part of one of the gripping devices; and Fig. 12 is an end view of one of the gripping devices as seen looking from left to right in Figs. 8 and 9.

Referring to Figs. 1 to 4 of the drawings, the frame of a planting machine comprises outer and inner side frame members 1 and 2. The inner side frame members 2 are joined at the front by a cylindrical shell 3, the outer side frame members are connected together at the front by a cross member 4, and both inner and outer side frame members are joined at the rear of the machine by a box 5 which serves to carry a supply of plants to be planted. The side frame members 1 may serve as shafts by which the machine is drawn over the ground by any suitable means. Journalled in the frame members at the rear of the machine is a shaft 6 which carries the running wheels 7. At the front of the machine is a V-shaped share 8 for throwing up a furrow. Behind this share are two inclined wheels 9 separately mounted in depending brackets 10 from the side members 2. The wheels 9 serve to press the soil firmly about the roots of the plants after these have been deposited root downwards in the furrow as hereinafter described. Seats 11 for two operators are mounted on each side of the machine, being supported from the side frame members 1.

Suitably journalled in the frame of the machine near the front thereof is a transverse shaft 12 which carries two rollers 13 and 14, the roller 13 being of greater diameter than the roller 14. Suitably journalled near the rear of the machine is a shaft 15 parallel with the shaft 12 and carrying rollers 16 and 17 rotatably mounted thereon and aligned respectively with the rollers 13 and 14 and respectively of the same diameters. The rollers 16, 17 have each an integral sprocket wheel 18, 18' which are driven through sprocket chains 19, 19' from sprocket wheels 20, 20' on the shaft 6. Trained over the pair of rollers 13 and 16 is an endless chain 21 and trained over the pair of rollers 14 and 17 is an endless chain 22. The sizes of the sprockets 18, 19, 18', 19' are such that the peripheral speeds of the chains 20, 21 are the same. The chain 21 consists of links 23 hingedly connected together, each link presenting outwardly a platform 24 extending transversely of the chain 21 and being stepped downwardly at 25 so that the part adjacent the chain 22 is somewhat depressed with respect to the part remote from the chain 22. The chain 22 also consists of links 26 hingedly connected together. Each link 26 has rigidly secured thereto an arm 27, the same arms 27 being arranged at a slight angle to the chain 22 when the latter is straight so that they will fit snugly one on top of the other in substantially flat relation as shown. The arms 27 are arranged in the same vertical plane as the chain 22 and they are of such length and arranged at such inclination of the chain 22 that their outer ends come to lie adjacent to the platforms 24 of the chain 21 when both chains are straight, that is to say, for example, along the upper stretches of the two chains between the topmost points of the rollers 13, 16 and 14, 17. Each arm 27 carries at its outer extremity a gripping device which is adapted to grip a plant carried by an adjacent platform 24 and carry it to the soil and release it in a manner to be hereinafter described. Each gripping device comprises two arms 28, 29 which extend laterally from a fixed pin 30 upstanding from the arm 27. The arm 28 has a cylindrical boss 32 by which it is secured to the pin 30 at the lower part thereof by means of a taper pin 31 so that it projects laterally at right angles to the chain 22 so as to overlie the downwardly stepped part of the adjacent platform 24 so long as both chains are straight. The arm 29 is pivoted by means of a hollow cylindrical boss 33 above the boss 32 to the pin 30. The engaging surfaces of the bosses 32 and 33 are stepped so that the movement of the arm 29 is limited to an angle of somewhat less than 90°. The arm 29 is bent downwardly from the boss 33 so that its outer end lies on the arm 27. The outer end of the arm 29 is bent at right angles, as shown, and carries an upstanding pin 34 adapted to cooperate with an upstanding pin 35 on the end of the arm 28. The arm 29 is slightly longer than the arm 28 so that when it is swung about its pivot it can come into position with its pin 34 slightly separated from the pin 35 and in line therewith and with the arm 28 as shown in dotted lines in Fig. 3. This is the closed position of the gripping device, the open position being shown in full lines in Fig. 3.

The arm 29 is urged to open position by means of a spring 36 within the hollow boss 33 and secured at one end to the boss 33 and at the other to the boss 32. The boss 33 carries a projection 37 projecting at right angles to the arm 29 and this cooperates with a cam or guide 38 fixed to the frame of the machine. The cam or guide 38 is mounted at the side of the chain 22 and is so shaped that it approaches the said chain immediately above the shaft 12 so as to engage the projections 37 and swing the arm 29 against the action of the spring 36 into closed position and to continue thereafter in the same vertical plane bearing against the projections 37 until they have reached the lowest point of their travel after which the cam or guide 38 recedes from the projections so as to allow the arm 29 to return to open position. It will be apparent that as the chain 22 passes round its roller 14 the arms 27 will stand out almost tangentially of the roller 14 and the ends thereof will thus be separated from the ends of adjacent arms. Moreover the height of the rollers 13, 14 above the ground and the length of the arms 27 will be so chosen that when the latter reach the lowest point of their travel the grippers carried thereby will be in position to deposit the plants root downwards in the furrow. The operation of the machine is as follows:

As the machine is drawn forward over the ground the two endless chains 21, 22 will be moved around their path around the rollers. Since the ends of the arms 27 are substantially on a level with the platforms 24 it is apparent that immediately above the shaft 12 the platform 24 is moving at substantially the same speed as the adjacent gripper, i. e. the adjacent pair of pins 28, 29, and in substantially the same direction and indeed this will be true along the whole of the upper stretches of the chains. The plants are taken by hand by the operators from the box 5 and placed on the platforms 24 so as to lie transversely of the chain 21, with their root portions away from the chain 22 and their leaf portions overlying the downwardly stepped parts of the platforms 23 and just to the rear of the pins 35. The operators will of course as far as possible keep all the platforms 24 along the upper stretch of the chain 21 filled with plants, i. e. one plant to each platform. It will be understood that along the upper stretches of the chains there will be a pair of arms 28, 29 moving forward adjacent a platform 24 carrying a plant immediately behind the pin 35 of the arm 28. When any particular pair of arms 28, 29 comes into position above the shaft 12, the projection 37 strikes the cam or guide 38, whereby the arm 29 is swung round towards the arm 28. In so doing its pin 34 strikes the plant and pushes it against the pin 35. Finally as the pin 34 reaches its end position level with the stationary pin 35 the plant will have been swung from a position transverse to the chains to a position in line therewith, i. e. at right angles to the arm 28, and is gripped in this position between the pins 34, 35. It will also be apparent that the platform 24 which has up to then supported the plant moves downwardly over the roller 13 whilst the plant is carried forward gripped between the pins 34, 35 until the particular link 26 which carries the arm 27 carrying the pair of arms 28, 29 in question itself starts to turn downwardly over the roller 14. When this occurs the pair of pins 34, 35 carrying the plant gripped between them are moved relatively rapidly over an arcuate path towards the ground, and when they reach their lowest point they present the plant vertically root downwards into the furrow. At this point the projection 37 is released from the constraining guide 38 and the arm 29 and pin 34 return to the open position under the action of the spring 36 and so release the plant. The soil is then pressed down onto the plant by the oncoming wheels 9.

Referring now to the modification illustrated in Figs. 5, 6 and 7, the frame of the planting machine, as before, comprises side frame members 41, 42, shell 43, cross member 44 and box 45. A shaft 46 journalled in the frame members carries running wheels 47 and sprockets 60, 60′ respectively driving rollers 56, 57 mounted on a shaft 55 also journalled in the frame, through the agency of sprocket chains 59, 59′ and sprocket wheels 58, 58′. The machine is also provided with a V-shaped share 48 and inclined wheels 49 mounted in depending brackets 50 from the side members 42 and seats 51. So far the construction of the machine is similar to that described with reference to Figs. 1 to 4 and the rollers 56, 57 are driven at the same peripheral speed. Near the forward end of the machine are two shafts 52, 52′ suitably journalled in the frame of the machine and respectively carrying rollers 53, 54 respectively of the same size as rollers 56, 57. The shaft 52 is in front of the shaft 52′ and the three shafts 52, 52′, 55 are parallel and in line. Further the rollers 53 and 56 are aligned as also are the rollers 54, 57. Trained over the rollers 53, 56 is an endless chain 61 comprising links 63 having platforms 64 stepped downwardly at 65. The construction of the chain 61 is substantially similar to that of the chain 21 of the construction described with reference to Figs. 1 to 4. Trained over the rollers 54, 57 is an endless chain 62 consisting of links 66 each carrying rigidly secured thereto an arm 67 arranged in the same manner as the arms 27 on the chain 22 previously described. Along the upper stretches of the chains the extremities of the arms 67 move adjacent to and together with corresponding platforms 64 of the chain 61. At the forward extremity of each arm 67 is an upstanding pin 70 and on this is pivoted a pin 68 having a hollow cylindrical boss 72 surrounding the pin 70. Above the boss 72 of the arm 68 is a hollow cylindrical boss 73 by which an arm 69 is pivoted to the pin 70. The arm 69 is bent downwardly from the boss 73 so that at its end it lies in the same plane as the arm 68, as shown in Fig. 7. The arm 68 carries at its end an upstanding pin 75 and the arm 69 carries an upstanding pin 74. It will be seen, therefore, that the pins 74 and 75 can come together to grip a plant between them and, moreover, that both arms 68, 69 can pivot about the pin 70 when in closed position, as will be hereinafter described. The movement of the arm 68 is limited to angle of about 90° by suitable stops (not shown) on the arm 67, so that the said arm 68 can rotate from a position at right angles to the arm 67 to a position in line therewith. The arm 68 is constantly urged into its position at right angles to the arm 67 by means of a spring 76 within the hollow boss 72 and connected at one end to the boss 72 and at the other end to the arm 67 or to the pin 70. The arm 69 is urged into open position, that is away from the arm 68, by means of a spring 77 within the boss 73 and secured at one end to the boss 73 and at the other to the pin 70. The relative movement of the arm 69 with respect to the arm 68, towards open position, is limited by a suitable stop (not shown) carried by the boss 72. The normal open position of the pairs of arms 68, 69 is shown in the right hand three pairs of arms of Fig. 6. The boss 73 is provided with a projection 78 extending therefrom on the side opposite to the arm 69 and below this the boss 72 has a shorter projection 79 somewhat inclined to the arm 68. Fixedly mounted on the frame of the machine is a cam or guide 80 adapted to cooperate with the projection 78. This cam or guide 80 is arranged alongside the path of the projection 78 and immediately above the shaft 52′ it starts to approach the chain 62 so as to bear against the projection 78 and so rotate the arm 69 so that it closes upon the arm 68. The arms 67 are of such length that as one of the links 66 of the chain 62 starts to pass over the roller 54, the extremity of the arm 67 carried thereby is above the shaft 52. At this place the cam or guide 80 approaches more closely to the chain 62 so as to cause the arms 69 to rotate into line with their arms 67 taking with them the arms 68 and overcoming the action of the springs 76, 77. Thereafter during the arcuate path of the end of the projection 78 downward the cam or guide 80 continues to press against the projection 78 so as to keep the pair of arms 68, 69 in line with their corresponding arms 67. Near the lowest part of the path of the projection 78 the cam or guide 80 is deflected radially outward somewhat with respect to the shaft 52′ so as to release the end of the projection 78 and it is formed at this part with a projecting cam surface 81 which engages the projection 79 and so maintains the arm 68 in line with the arm 67. The pin 74 is therefore separated from the pin 75 after the lowest point of the path of the projection 79 has been reached, the cam 81 merges into the cam 80, which then recedes to its original distance from the chain 62 so that the arm 68 can return to its original position at right angles to the arm 67 under the action of the spring 76 and the arm 69 can return to its open position with respect to the arm 68 under the action of the spring 77.

The operation of the machine is similar in its effect to that of the machine described with reference to Figs. 1 to 4 but will be briefly summarized as follows:

The plants are fed by hand from the box 45 onto the platforms 64 with their leaf portions overhanging the downwardly stepped parts adjacent the chain 62 and lying between the pairs of pins 74, 75. As the machine moves forward the pairs of pins 74, 75 with the leaves of the plants lying between them move forward together with and overlapping the corresponding platforms 64. Just above the shaft 52′ the pin 75 starts to approach the pin 74 and finally grips a plant. When a pair of arms 68, 69 come to position above the shaft 52 they are rotated, carrying the plant gripped between the pins 74, 75 into line with the arm 67 by which they are carried under the action of the cam or guide 80 on the projection 78. Thereafter the link 66 carrying the arm 67 moves down over the roller 54 and the plant is thereby carried downwardly at the extremity of the arm 67 towards the soil. When the plant is at its lowermost point it is released by the movement of the pin 74 away from the pin 75, the former having been released under the action of the spring 77 by the withdrawal of the cam 80 from the projection 78, and the plant is deposited in the furrow made by the share 48. The oncoming wheels 49 then press down the soil onto the plant. The arms 68, 69 then return to their original position under the action of the springs 76, 77, the constraints of the guides or cams 80, 81 having been removed.

Referring to Figs. 8 to 12 of the drawings, as in the constructions above described, the machine has a frame comprising side frame members 101, 102, shell 103, cross member 104 and box 105. A shaft 106 journalled in the frame members carries running wheels 107 and sprockets 120, 120', respectively driving rollers 116, 117 mounted on a shaft 115 also journalled in the frame through the agency of sprocket chains 119, 119' and sprocket wheels 118, 118' integral with rollers 116, 117 respectively. The machine is also provided with a V-shaped share 108 and inclined wheels 109 mounted on brackets 110 depending from the side members 101. The relative sizes of the sprockets 120, 118, 120', 118' and rollers 116 and 117 are such that the rollers are driven at the same peripheral speeds. Near the forward end of the machine is a shaft 112 suitably journalled in the frame of the machine and carrying rotatably mounted thereon rollers 113 and 114 respectively aligned with and of the same size as rollers 116 and 117. Trained over the rollers 113 and 116 is an endless chain 121 comprising links 123 having platforms 124 stepped downwardly at 125 and having low end walls 124'. The construction of the chain 121 is substantially similar to that of the chain 21 of Figs. 1 to 4. Trained over the rollers 114 and 117 is an endless chain 122 consisting of links 126 each carrying rigidly secured thereto an upstanding arm 127, the said arms 127 standing out at right angles to the chain 122. In this construction the shaft 115 is mounted somewhat higher than the shaft 112 so that the chains 121 and 122 slope downwardly from the rear to the front of the machine and further it will be seen that the two chains travel at the same speed and in the same direction. Each arm 127 has at its extremity a lateral bifurcated extension 128, the bifurcations of which partially embrace a flat rail 129 which is fixedly mounted on the frame of the machine. The rail 129 is endless, and is so shaped as to conform to the path of the bifurcation of the extension 128. The rail 129 carries a plurality of gripper carrying members 130 equal in number to the number of arms 127 and arranged on the rail between consecutive arms 127. Each member 130 is formed with a base portion 131 adapted partially to embrace the flat rail 129, the base portion 131 being interrupted below the rail to permit of passage past suitable standards or supports for supporting the rail 129 on the frame of the machine. Upstanding from the base portion 131 is a bifurcated bracket 132 in which is pivoted one arm 133 of a gripping device by means of a pin 134. The arm 133 can rock about the pin 134 but its movement is limited by a stop 135 so that it can swing from a position at right angles to the arm 127 to a position parallel thereto. Along the upper stretch of the rail 129 the arms 133 will project laterally towards the chain 121 and the dimensions of the rollers 116, 117, 113, 114, arms 127 and members 130 are such that the ends of the arms 133 just overlie the downwardly stepped portions of adjacent platforms 124. The arm 133 has an upstanding pin 135 at its outer end. Pivoted to the arm 133 by means of a vertical pin 136 (Fig. 12) is an arm 137 having an upstanding pin 138 at its end. The arm 137 is provided at the pivot with a cylindrical boss which fits over the pin 136 and within which is a spring 139 connected at one end to the arm 133 and at the other to the arm 137 so as to urge the latter towards the arm 133 whereby the pins 135 and 138 are closed one on the other. The arm 138 is provided intermediate its ends with a depending pin 140 which bears against a flat guide rail 141. This guide rail is fixed to the frame of the machine and serves to rotate the gripping devices about the pivots 134 and to open the said devices at the correct instants, as will be more fully described. Along the upper stretch of the chains the guide rail 141 is in a vertical plane and is parallel to the chains and the rail 129, and is at such distance therefrom that it bears against the pin 140 sufficiently to maintain the arm 137 separated from the arm 133 so that the gripping devices are in open position. Shortly before the guide rail 141 is above the shaft 112 it recedes from the rail 129 sufficiently to allow the arm 137 of a gripping device to close on the arm 133 and thereafter the inside flat surface of the guide rail 141 maintains this same distance from the path of the pivot pins 134, during the downward sweep at the forward end of the machine. The guide rail turns downward at the front of the machine but instead of keeping the same distance from the shaft 112 it gets slightly further away, at the same time being twisted over and being turned inwardly towards the shaft 112 and it lies only just to the side of the vertical plane through the pins 134. The effect of this shape of the guide rail 141 is to turn the arms 133 and 137 about the pivots 134 until they are parallel with the corresponding arms 127 as they pass downward at the front end of the machine. When the rail reaches its lowest point it suddenly approaches the shaft 112 so as to bear against the pin 140 of a gripper moved past this point and open to arms 137, 133. Continuing round the path of the grippers the guide rail 141 is twisted back again to the vertical plane, always bearing against the pins 140 so that by the time the arms 133, 137 again reach the upper stretch of their path they are again projecting laterally from the rail 129 and are in open position to receive plants between the pins 135, 138. It is to be understood that the members 130 fit sufficiently tightly on the rail 129 that they will not move along it by gravity but will only move along it if pushed by arms 127. The pivots 134 however are free so that as the members 130 are raised at the rear of the machine the tendency of the arms 133, 137 is to return under gravity to the position shown in Fig. 3 and the return movement is assisted by the guide rail 141.

The operation of the machine is as follows: The plants are fed by hand to the platforms 124 so that their leaf portions overhang the downwardly stepped parts of the platforms and lie between the pins 135, 138 of adjacent gripping devices. As the machine moves forward the chains 121, 122 are driven round the rollers 113, 116, and 114, 117 and the plants are conveyed towards the front end of the machine. At this time the pins 135, 138 are being held apart by reason of the guide rail 141 bearing against the pins 140. As any particular arm 127 moving with it the gripping device comprising the pair of arms 133, 137 and pins 135, 138, reaches a position almost above the shaft 112, the guide rail 141 permits the arm 137 to close on the arm 133 whereby the pins 138, 135 come together to grip the leaf of the plant between them. As the arm 127 moves downward over the roller 114 the arms 133, 137 are rotated together still gripping the plant between the pins 135, 138 about the pin 134, until they are in a substantially radial position with respect to the shaft 112. At the lowest point of their travel the pins 135, 138 will be holding the plant in a vertical position with its root downward in the furrow made by the share 108. The arms 133, 137 are then separated by the action of the guide rail 141 on the pin 140 whereby the plant is released root downward in the furrow and the oncoming wheels 109 press down the earth onto the plant roots. The gripping devices are forced further round with the chain 122 and finally returned to their original position on the upper stretch of the rail 129.

I claim:

1. A plant setting machine having a conveyor on to which the plants are fed, a series of gripping devices carried by an endless rail, means for urging the said gripping devices along said rail, the said gripping devices at the instant of transfer of the plants thereto from the conveyor travelling at substantially the same speed and in substantially the same direction as the portion of the conveyor carrying the plant being transferred.

2. A plant setting machine comprising an endless conveyor band on to which the plants are fed so as to lie transversely thereof the said band passing over rotary guiding and driving means at the forward and rear ends respectively of the machine, a second endless band passing over rotary guiding and driving means at the two forward and rear ends respectively of the machine, the said second band carrying arms mounted substantially tangentially thereto, and the said arms carrying gripping devices at their extremities which move in the top portion of their path alongside the conveying path of the conveyor band and at the same speed, means for causing the gripping devices to grip a plant carried by the conveyor to turn it from a position transverse to the conveyor to a position in the vertical plane of motion of the band and to release it at the lower part of travel of the gripping devices.

3. A plant setting machine comprising an endless conveyor band on to which the plants are fed so as to lie transversely thereof, a second endless band carrying arms mounted substantially tangentially to this band and carrying gripping devices at their extremities which move along the top portion of their path alongside the conveying path of the conveyor band, means for driving both bands at the same speed, means for causing the gripping devices to grip a plant carried by the conveyor band, and means for causing the gripping devices to hang vertically downwards at the lower part of their travel.

4. A plant setting machine comprising an endless conveyor band, a series of gripping devices each comprising two co-operating plant gripping fingers pivotally mounted at the extremities of arms carried by an endless circulating band and mounted tangentially to said band, the gripping devices being caused to travel alongside and at the same speed as the conveying portion of the conveyor band and then to turn downwards near the forward end of their travel, means for causing the fingers to come together to grip a plant near the forward end of the conveying path and means for turning the fingers with the plant gripped between them so that the latter lies in line with the arm carrying the fingers.

5. A plant setting machine having a conveyor on to which the plants are fed, a series of devices for taking the plants directly from the conveyor and carrying them to the soil, means for supporting said devices and constraining them to move in a closed path and means for moving said devices in the closed path, the said devices at the instant of direct transfer of the plants thereto from the conveyor travelling at substantially the same speed and in substantially the same direction as the portion of the conveyor carrying the plant being transferred.

6. A plant setting machine having a conveyor onto which the plants are fed, an endless movable band, a series of devices carried by said band for carrying the plants from the conveyor to the soil, means for successively transferring the plants from the conveyor to the said devices, and means for so driving and guiding said devices that at the instant of transfer of the plants thereto from the conveyor they travel at substantially the same speed and in substantially the same direction as the portion of the conveyor carrying the plants being transferred.

7. A plant setting machine having an endless conveyor band onto which the plants are fed, a second endless band, a series of devices carried by said second band for carrying the plants from the conveyor band to the soil, means for successively transferring the plants from the conveyor band to the said devices, and means for so driving and guiding said devices that at the instant of transfer of the plants thereto from the conveyor band they travel alongside the conveyor band and at the same speed as the conveyor band.

8. A plant setting machine having an endless conveyor band onto which the plants are fed, a second endless band, a series of gripping devices each comprising a pair of relatively movable fingers, carried by said second band, means for so moving and guiding said gripping devices that they move alongside the conveyor band and at the same speed as the conveyor band over a portion of their path and means for actuating said gripping devices to cause them to grip plants carried by said conveyor band during movement over the said portion of their path.

9. A plant setting machine having an endless conveyor band onto which the plants are fed, a series of devices for taking the plants directly from the conveyor band and carrying them to the soil, means for supporting said devices and constraining them to move in a closed path at least a part of which is adjacent to the conveyor band, means for transferring plants from said conveyor band to said devices whilst the latter are adjacent to said conveyor band and means for moving said devices in the closed path, the said devices at the instant of direct transfer of the plants thereto from the conveyor band traveling at the same speed and in the same direction as the portion of the conveyor band carrying the plant being transferred.

10. A plant setting machine having an endless conveyor band onto which the plants are fed, a second endless band, a series of gripping devices for carrying the plants from the conveyor band to the soil, supporting means carried by said second endless band to which said gripping devices are attached at points remote from the points at which the supporting means are attached to the band, and means for so moving and guiding said gripping devices that at the instant of transfer of the plants thereto from the conveyor band they travel alongside the conveyor band and at substantially the same speed as the conveyor band.

11. A plant setting machine having an endless conveyor band onto which the plants are fed, a movable carrier, a series of arms mounted on the movable carrier, a series of gripping devices respectively carried at the extremities of said arms for carrying the plants from the conveyor band to the soil and means for so moving and guiding the said gripping devices that at the instant of transfer of the plants thereto from the conveyor band they travel alongside the band and at substantially the same speed as the band.

12. A plant setting machine having a conveyor onto which the plants are fed, an endless carrier, a series of arms mounted on the endless carrier, and a series of gripping devices respectively carried at the extremities of said arms for carrying the plants from the conveyor to the soil and means for so moving and guiding the said gripping devices that at the instant of transfer of the plants thereto from the conveyor they travel at substantially the same speed and in substantially the same direction as the portion of the conveyor carrying the plants being transferred.

13. A plant setting machine having an endless conveyor band onto which the plants are fed, a second endless band, a series of arms mounted substantially tangentially to said second endless band, a series of gripping devices carried at the extremities of said arms for carrying the plants from the conveyor band to the soil, means for actuating the gripping devices and means for so guiding and driving said second endless band that the said gripping devices at the instant of transfer of the plants thereto from the conveyor band travel alongside the latter and at substantially the same speed as the conveyor band.

14. A plant setting machine having a conveyor onto which the plants are fed, an endless band, a series of arms mounted on the band substantially tangentially thereto, a series of gripping devices carried at the extremities of said arms for carrying the plants from the conveyor to the soil, means for normally holding the gripping devices open, means for closing the gripping devices to transfer a plant thereto and means for so moving and guiding said band that the said gripping devices at the instant of transfer of a plant thereto from the conveyor travel at substantially the same speed and in substantially the same direction as the portion of the conveyor carrying the plant being transferred.

15. A plant setting machine having a conveyor onto which the plants are fed, a series of devices for taking the plants directly from the conveyor and carrying them to the soil, means for supporting said devices and constraining them to move in a closed path, means for moving said devices in the closed path and means for turning the plants into a position root downwards for planting, the said devices at the instant of transfer of a plant thereto from the conveyor traveling at the same speed and in substantially the same direction as the part of the conveyor carrying the plant being transferred.

16. A plant setting machine comprising an endless conveyor band onto which the plants are fed so as to lie across the same, a series of devices for taking the plants directly from the conveyor band, turning the plants from their position transverse to the band and carrying them to the soil in a vertical position, means for supporting said devices and constraining them to move in a closed path and means for moving said devices in the closed path, the said devices at the instant of transfer of a plant thereto from the conveyor band traveling alongside the band and at substantially the same speed as the band.

17. A plant setting machine comprising a conveyor onto which the plants are fed, a series of gripping devices each comprising two cooperating fingers for taking the plants directly from the conveyor and carrying them to the soil, means for supporting said gripping devices and constraining them to move in a closed path, means for moving said gripping devices in said closed path, means for causing said fingers to come together to grip a plant and means for causing said fingers to separate to release the plant, the said moving and constraining means being so arranged that the said devices at the instant of gripping move alongside and at substantially the same speed as the portion of the conveyor carrying the plant being gripped.

18. A plant setting machine comprising an endless conveyor band, a series of gripping devices each comprising two cooperating fingers for taking plants from the conveyor band and carrying them to the soil, means for supporting said gripping devices and constraining them to move in a closed path, means for moving said gripping devices in the closed path, means for causing said fingers to come together to grip a plant and means for separating said fingers to release a plant the said moving and constraining means being so arranged that the said gripping devices at the instant of gripping travel alongside the conveyor band and at the same speed as the conveyor band.

19. A plant setting machine having an endless conveyor band onto which the plants are fed and a series of gripping devices each comprising a pair of relatively movable fingers carried by a movable band for carrying the plants from the conveyor band to the soil, the said gripping devices at the instant of transfer of the plants thereto from the conveyor band travelling alongside the movable band, and at the same speed as the movable band, and cam means coacting with the gripping devices to cause them to operate to grip the plants at the point of transference of the plants from the conveyor band to the movable band.

ISRAEL POMIERANIEC.